United States Patent
Ogawa et al.

(10) Patent No.: US 7,457,218 B2
(45) Date of Patent: Nov. 25, 2008

(54) DATA REPRODUCING METHOD USING TILT ADJUSTMENT AND DATA REPRODUCING APPARATUS FOR THE SAME

(75) Inventors: Masatsugu Ogawa, Tokyo (JP); Shuichi Ohkubo, Tokyo (JP)

(73) Assignee: NEC Corporation, Tokyo (JP)

( * ) Notice: Subject to any disclaimer, the term of this patent is extended or adjusted under 35 U.S.C. 154(b) by 767 days.

(21) Appl. No.: 10/997,897

(22) Filed: Nov. 29, 2004

(65) Prior Publication Data
US 2005/0117504 A1 Jun. 2, 2005

(30) Foreign Application Priority Data
Nov. 27, 2003 (JP) ............... 2003-398198
Oct. 27, 2004 (JP) ............... 2004-313146

(51) Int. Cl.
*G11B 7/00* (2006.01)
(52) U.S. Cl. ................... 369/53.19; 369/44.32
(58) Field of Classification Search ............. 369/53.19, 369/44.32
See application file for complete search history.

(56) References Cited

U.S. PATENT DOCUMENTS

| | | | | |
|---|---|---|---|---|
| 5,343,454 | A * | 8/1994 | Watanabe et al. | 369/44.32 |
| 6,243,337 | B1 | 6/2001 | Miyanabe et al. | |
| 6,493,296 | B1 | 12/2002 | Fukumoto et al. | |
| 6,754,157 | B2 * | 6/2004 | Osada | 369/53.28 |
| 6,804,187 | B2 * | 10/2004 | Miyanabe et al. | 369/124.03 |
| 7,054,241 | B2 * | 5/2006 | Kondo et al. | 369/44.32 |
| 2002/0048243 | A1 | 4/2002 | Yanagisawa et al. | |
| 2003/0095485 | A1 | 5/2003 | Katayama | |
| 2003/0189883 | A1 * | 10/2003 | Konishi et al. | 369/44.32 |
| 2004/0208101 | A1 | 10/2004 | Ohkubo et al. | |

FOREIGN PATENT DOCUMENTS

| | | |
|---|---|---|
| EP | 1 178 473 A2 | 2/2002 |
| JP | 64-088931 | 4/1989 |
| JP | 08-036773 | 2/1996 |
| JP | 9-054953 | 2/1997 |
| JP | 2000-149298 A | 5/2000 |
| JP | 2001-256652 A | 9/2001 |
| JP | 2001-256652 A | 9/2001 |
| JP | 2001-266381 A | 9/2001 |
| JP | 2002-056556 A | 2/2002 |
| JP | 2003-016677 A | 1/2003 |
| JP | 2003/157553 A | 5/2003 |
| WO | WO 00/10166 | 2/2000 |

* cited by examiner

*Primary Examiner*—Wayne Young
*Assistant Examiner*—Van T Pham
(74) *Attorney, Agent, or Firm*—Foley & Lardner LLP

(57) ABSTRACT

In a method of obtaining a reproduction signal with good quality from a data recording medium, two actual signals are generated as first and second signals $I_1$ and $I_2$ from detection signals obtained from the data recording medium. A coefficient k which has linear correlation with a tilt is calculated based on the first and second signals $I_1$ and $I_2$. A reproduction signal in which influence of the tilt is eliminated, is reproduced by using the coefficient k and the first and second signals $I_1$ and $I_2$.

22 Claims, 9 Drawing Sheets

DATA REPRODUCING METHOD USING TILT ADJUSTMENT AND DATA REPRODUCING APPARATUS FOR THE SAME

BACKGROUND OF THE INVENTION

1. Field of the Invention

The present invention relates to a data reproducing method using tilt adjustment to a high density recording optical disc and a data reproducing apparatus for the same.

2. Description of the Related Art

In an optical disc apparatus, data is recorded on an optical disc and the data is read out from the optical disc, by using an optical head. In such an optical disc apparatus, a tilt of the optical head to the optical disc has a large influence on the performance of the optical disc apparatus. If there is not any tilt between the optical disc and the optical head, a laser beam is well irradiated to the data recording surface of the optical disc and good record reproduction is carried out. However, when there is a tilt between the optical disc and the optical head, an aberration is caused in the laser beam irradiated to the data recording surface of the optical disc, resulting in degradation of the record reproduction performance.

In the tilt are generally a radial tilt as a tilt of the optical head in a radial direction from a perpendicular direction to the data recording surface of the optical disc, and a tangential tilt as a tilt of the optical head in a perpendicular direction to the radial direction from the perpendicular direction to the data recording surface of the optical disc.

FIG. 2 shows a relation between error rate and radial tilt. It could be seen from FIG. 2 that the error rate increases when the radial tilt becomes large. That is, this shows that the record reproduction performance degrades remarkably when the tilt is caused. Therefore, various methods are proposed of correcting the tilt to improve the reproduction performance.

In Japanese Laid Open Patent example Application (JP-P2003-157553A: first conventional example), one main beam and two sub beams are irradiated to the optical disc, and a tilt is detected based on detection results of these beams. An optical disc or an optical head is controlled based on a result of the tilt detection so as to cancel the tilt.

Also, in Japanese Laid Open Patent Application (JP-P2003-16677A: second conventional example), a 4-divided photo detector is used. A radial tilt is detected based on light quantity balance between two detection areas of the detector divided a line in a movement direction of the optical head and a tangential tilt is detected based on a light quantity balance between two detection areas of the detector divided by a line perpendicular to the movement direction of the optical head. The tilt control is carried out based on the detected tilt.

Also, in Japanese Laid Open Patent Application (JP-P2001-256652A: third conventional example), a tilt control is carried out through a signal process without any mechanical tilt control by changing a rate of outputs from two detection areas of a detector divided by a line in a movement direction of the optical head in accordance with the tilt.

Also, in Japanese Laid Open Patent Application (JP-A-Heisei 09-054953: fourth conventional example), three or five beams are irradiated to an optical disc, and a tilt is detected by using a reflection intensity of each beam. One of these beams which has the most excellent reproduction quality is selected for data reproduction.

Also, in Japanese Laid Open Patent Application (JP-P2000-149298A: fifth conventional example), DPP and DPD signals are generated by using detection signals of a main spot and side spots or detection signals of the side spots. A tilt angle of the optical disc is detected based on a difference calculation value between both of these signals.

However, a plurality of beams must be irradiated and the optical head becomes complicated in the first, fourth and fifth conventional examples. In addition, the tilt detection signal is obtained without any direct relation to the recorded signal or reproduction signal. Therefore, there would be a case where the tilt control is not carried to optimize the reproduction performance.

Also, in the fourth conventional example, an output of either of the three or five beams is used as a reproduction signal. The beam intensity of each beam must be large from the viewpoint to signal noise ratio (SNR), which requires a laser diode with a very high output. Therefore, the fourth conventional example is not in practical.

The second conventional example has a relatively simple structure. However, the tilt detection signal with enough precision cannot be obtained actually in such tilt detection.

The third conventional example has a relatively simple structure, and the tilt control is carried out by changing the output rate of the divided detection areas. However, the largest problem is in that an optimal output rate must be determined while a jitter or error rate as a parameter is measured (the error rate indicates a difference between a recorded bit string and the reproduced and decoded bit string and calculated from (error bits)/(a total of bits)). The jitter and the error rate do not have polarity. When such a parameter is used for the tilt control, a correction direction of the tilt cannot be immediately determined. Therefore, the tilt control is actually carried out while the direction of the tilt correction is changed in a positive or negative direction to find the optimal position. That is, the tilt control is carried out by using a so-called mountain climbing method. This requires a long learning time, and is very large performance degradation in the optical disc apparatus. In the third conventional example, it is described that a correction quantity of the output rate may be previously stored. However, the so-called mountain climbing method is needed to previously obtain the correction quantity. Also, the tilt changes depending on the temperature and humidity of the optical disc apparatus and has a time-based change. Therefore, sufficient precision could not be expected by the previously stored correction quantity.

Also, in most of the conventional tilt detection methods which are known at present, tilt detection is carried out by using a signal different from an actual reproduction signal. Therefore, an optimal tilt point for the reproduction signal and an optimal tilt point obtained from the tilt detection signal are often different. Therefore, It is not possible to say that the conventional tilt detection methods have a sufficient detection precision.

In conjunction with the above description, a tile detecting method is disclosed in Japanese Laid Open Patent application (JP-P-2002-56556A). In this conventional example, a light receiving section receives diffraction light reflected from a recording medium. A tile quantity of the recording medium is detected based on light intensity in interference region of the 0-th order diffraction light and one of the diffraction light components other than the 0-th order diffraction light of the received reflection light.

SUMMARY OF THE INVENTION

Therefore, an object of the present invention is to provide a data reproducing method using tilt adjustment in a high density recording optical disc and a data reproducing apparatus for the same, in which a reproduction signal is used for tilt detection.

Another object of the present invention is to provide a data reproducing method using a tilt adjustment in a high density recording optical disc and a data reproducing apparatus for the same, in which degradation of a reproduction signal can be prevented.

In an aspect of the present invention, a method of obtaining a reproduction signal with good quality from a data recording medium, is achieved by generating two actual signals as first and second signals $I_1$ and $I_2$ from detection signals obtained from the data recording medium; by calculating a coefficient k which has linear correlation with a tilt, based on the first and second signals $I_1$ and $I_2$; and by reproducing a reproduction signal in which influence of the tilt is eliminated, by using the coefficient k and the first and second signals $I_1$ and $I_2$.

Here, the data recording medium may be an optical data recording medium. The generating step may be achieved by detecting the detection signals by an optical detector from a reflection beam from the optical data recording medium when a light beam is irradiated to the optical data recording medium. In this case, when the optical detector has at least two detection areas, from which the detection signals are generated, the generating step may be achieved by generating the first and second signals $I_1$ and $I_2$ by grouping the at least two detection areas into two based on a line in a direction perpendicular to a radial direction of the optical data recording medium, and by combining the detection signals in units of groups when a light beam is irradiated to the optical data recording medium.

Also, the calculating step may be achieved by calculating the coefficient k from the following equation (1)

$$k = \frac{-\left((\sigma_1^2 + \sigma_2^2 + 2\sigma_{12})\left(\sum_i^N r_i q_i\right) - (\sigma_1^2 - \sigma_2^2)\left(\sum_i^N q_i^2\right)\right)}{(\sigma_1^2 + \sigma_2^2)\left(\sum_i^N (r_i^2 - q_i^2)\right) + 2\sigma_{12}\left(\sum_i^N (r_i^2 + q_i^2)\right)} \quad (1)$$

where an impulse response of the first signal $I_1$ is expressed by the following equation (2)

$$\sum_i^N h_{1i} \quad (2)$$

(N is a natural number and i is a time in units of clocks), and an impulse response of the second signal $I_2$ is expressed by the following equation (3)

$$\sum_i^N h_{2i} \quad (3)$$

(N is a natural number and i is time in units of clocks), an expected value of noise of the first signal $I_1$ is $\sigma_1$, an expected value of noise of the second signal $I_2$ is $\sigma_2$, and an expected value of correlation of the noises of the first and second signals $I_1$ and $I2$ is $\sigma_{12}$, $q_i = h_{1i} + h_{2i}$, and $r_i = h_{1i} - h_{2i}$.

Also, the calculating step may be achieved by calculating the coefficient k from the following equation (4)

$$k = \frac{(\sigma_1^2 - \sigma_2^2)}{2\sigma_{12} - (\sigma_1^2 + \sigma_2^2)} \quad (4)$$

where an expected value of noise of the first signal $I_1$ is $\sigma_1$, an expected value of noise of the signal $I_2$ is $\sigma_2$, and an expected value of correlation of the noises of the signals $I_1$ and $I_2$ is $\sigma_{12}$.

Also, the calculating step may be achieved by calculating the coefficient k from the following equation (5)

$$k = \frac{(\sigma_2^2 - \sigma_1^2)}{(\sigma_1^2 + \sigma_2^2)} \quad (5)$$

where an expected value of noise of the signal $I_1$ is $\sigma_1$, and an expected value of noise of the signal $I_2$ is $\sigma_2$.

Also, the calculating step may be achieved by calculating the coefficient k from the following equation (6) or (7)

$$k = \frac{SNR2 - SNR1}{SNR3} \quad (6)$$

$$k = \frac{SNR2 - SNR1}{SNR1 + SNR2} \quad (7)$$

where SNR1 is a ratio of a signal component and a noise component of the first signal $I_1$, SNR2 is a ratio of a signal component and a noise component of the second signal $I_2$, and SNR3 is a ratio of a signal component and a noise component of a signal $I_1 + I_2$ obtained by adding the first and second signals $I_1$ and $I_2$. In this case, the calculating may include calculating each of the SNR1, the SNR2, and the SNR3 from the following equation (8)

$$\frac{\left(\sum_m \varepsilon_m^2\right)^2}{E\left[\left(\sum_m \varepsilon_m n_m\right)^2\right]} \quad (8)$$

expressed by a vector $\epsilon$, the noise n indicating a difference between an ideal signal waveform and a waveform of the actual signal, and a symbol E[ ] indicating an expected value. Also, in this case, each of the SNR1, the SNR2, and the SNR3 may be selected as the least value among results of the equation (8) when the vector $\epsilon$ takes the following $\epsilon$1, $\epsilon$2, and $\epsilon$3, $\epsilon1 = (1, 2, 2, 2, 1)$ $\epsilon2 = (1, 2, 1, 0, -1, -2, -1)$, and $\epsilon3 = (1, 2, 1, 0, 0, 0, 1, 2, 1)$, Also, each of the SNR1, the SNR2, and the SNR3 may be a PRSNR as an SNR of a PR system which carries out signal reproduction using PRML to the first signal $I_1$, the second signal $I_2$, and a summation of the first and second signals $I_1$ and $I_2$.

Also, the reproducing step may be achieved by carrying out a calculation of $I_1+I_2+k*(I_1-I_2)$ by using the coefficient k, and the first and second signals $I_1$ and $I_2$ to produce a calculation resultant signal; and by reproducing the reproduction signal by using the calculation resultant signal.

Otherwise, the reproducing step may be achieved by adjusting a tilt between a data recording medium and a data recording/reproducing apparatus by using the coefficient k; and by reproducing the reproduction signal from the first and second signals $I_1$ and $I_2$.

In another aspect of the present invention, an apparatus of obtaining a reproduction signal with good quality from a data recording medium, includes a head section, and a processing section. The head section generates two actual signals as first and second signals $I_1$ and $I_2$ from detection signals obtained from the data recording medium. The processing section calculates a coefficient k which has linear correlation with a tilt, based on the first and second signals $I_1$ and $I_2$.

Here, the data recording medium may be an optical data recording medium. The head section may include a laser diode which irradiates a light beam to the optical data recording medium; and a light receiving section which detects the detection signals from a reflection light beam from the optical data recording medium. The light receiving section may have at least two detection areas, from which the detection signals are generated. The light receiving section may generate the first and second signals $I_1$ and $I_2$ by grouping the at least two detection areas into two based on a line in a direction perpendicular to a radial direction of the optical data recording medium, and by combining the detection signals in units of groups when a light beam is irradiated to the optical data recording medium.

Also, the processing section may include an impulse response calculating section which calculates an impulse response of the first signal $I_1$ expressed by the following equation (9)

$$\sum_{i}^{N} h_{1i} \tag{9}$$

(N is a natural number and i is a time in units of clocks), and an impulse response of the second signal $I_2$ expressed by the following equation (10)

$$\sum_{i}^{N} h_{2i} \tag{10}$$

(N is a natural number and i is time in units of clocks); and a coefficient calculating section which calculates the coefficient k from the following equation (11)

$$k = \frac{-\left((\sigma_1^2+\sigma_2^2+2\sigma_{12})\left(\sum_{i}^{N} r_i q_i\right)-(\sigma_1^2-\sigma_2^2)\left(\sum_{i}^{N} q_i^2\right)\right)}{(\sigma_1^2+\sigma_2^2)\left(\sum_{i}^{N}(r_i^2-q_i^2)\right)+2\sigma_{12}\left(\sum_{i}^{N}(r_i^2+q_i^2)\right)} \tag{11}$$

wherein an expected value of noise of the first signal $I_1$ is $\sigma_1$, an expected value of noise of the second signal $I_2$ is $\sigma_2$, and an expected value of correlation of the noises of the first and second signals $I_1$ and $I2$ is $\sigma_{12}$, $q_i=h_{1i}+h_{2i}$, and $r_i=h_{1i}-h_{2i}$.

Also, the processing section may include an expected value calculating section which calculates an expected value $\sigma_1$ of noise of the first signal $I_1$, an expected value $\sigma_2$ of noise of the signal $I_2$, and an expected value $\sigma_{12}$ of correlation of the noises of the signals $I_1$ and $I_2$; and a coefficient calculating section which calculates the coefficient k from the following equation (12)

$$k = \frac{(\sigma_1^2 - \sigma_2^2)}{2\sigma_{12} - (\sigma_1^2 + \sigma_2^2)} \tag{12}$$

by using the expected value $\sigma_1$, the expected value $\sigma_2$, and the expected value $\sigma_{12}$.

Also, the processing section may include an expected value calculating section which calculates an expected value $\sigma_1$ of noise of the first signal $I_1$, and an expected value $\sigma_2$ of noise of the signal $I_2$; and a coefficient calculating section which calculates the coefficient k from the following equation (13)

$$k = \frac{(\sigma_2^2 - \sigma_1^2)}{(\sigma_1^2 + \sigma_2^2)} \tag{13}$$

by using the expected value $\sigma_1$, and the expected value $\sigma_2$.

Also, the processing section may include an SNR calculating section which calculates SNR1 as a ratio of a signal component and a noise component of the first signal $I_1$, SNR2 as a ratio of a signal component and a noise component of the second signal $I_2$, and SNR3 as a ratio of a signal component and a noise component of a signal $I_1+I_2$ obtained by adding the first and second signals $I_1$ and $I_2$; and a coefficient calculating section which calculates the coefficient k from the following equation (14) or (15)

$$k = \frac{SNR2 - SNR1}{SNR3} \tag{14}$$

$$k = \frac{SNR2 - SNR1}{SNR1 + SNR2} \tag{15}$$

by using the SNR1, the SNR2 and the SNR3.

In this case, the SNR calculating section may calculate each of the SNR1, the SNR2, and the SNR3 from the following equation (16)

$$\frac{\left(\sum_{m} \varepsilon_m^2\right)^2}{E\left[\left(\sum_{m} \varepsilon_m n_m\right)^2\right]} \tag{16}$$

where $\varepsilon$ is a vector, n is the noise indicating a difference between an ideal signal waveform and a waveform of the actual signal, and a symbol E[ ] indicating an expected value. Also, each of the SNR1, the SNR2, and the SNR3 may be selected as the least value among results of the equation (16) when the vector $\epsilon$ takes the following $\epsilon 2$, $\epsilon 2$, and $\epsilon 3$, $$\epsilon 1 = (1, 2, 2, 2, 1)$$

$$\epsilon 2 = (1, 2, 1, 0, -1, -2, -1),$$

and $$\epsilon 3 = (1, 2, 1, 0, 0, 0, 1, 2, 1),$$

Also, each of the SNR1, the SNR2, and the SNR3 may be a PRSNR as an SNR of a PR system which carries out signal reproduction using PRML to the first signal $I_1$, the second signal $I_2$, and a summation of the first and second signals $I_1$ and $I_2$.

Also, the processing section may further include a signal correcting section which carries out a calculation of $I_1 + I_2 + k*(I_1 - I_2)$ by using the coefficient k, and the first and second signals $I_1$ and $I_2$ to produce a calculation resultant signal.

Otherwise, the apparatus may further include a servo controller which controls the head section to eliminate the tilt; and a system controller which controls the servo controller based on the coefficient k.

DESCRIPTION OF THE PREFERRED EMBODIMENTS

Hereinafter, a data reproducing apparatus of the present invention will be described in detail with reference to the attached drawings. The data reproducing apparatus may have a data recording function. The present application is related to U.S. patent application Ser. No. 10/736,572 filed on Dec. 17, 2003 and entitled "OPTICAL DISK, OPTICAL DISK RECORDING/REPRODUCTION APPARATUS, AND OPTICAL DISK SIGNAL QUALITY EVALUATION METHOD". The disclosure of U.S. patent application Ser. No. 10/736,572 is incorporated herein by reference.

First Embodiment

Figure 1:
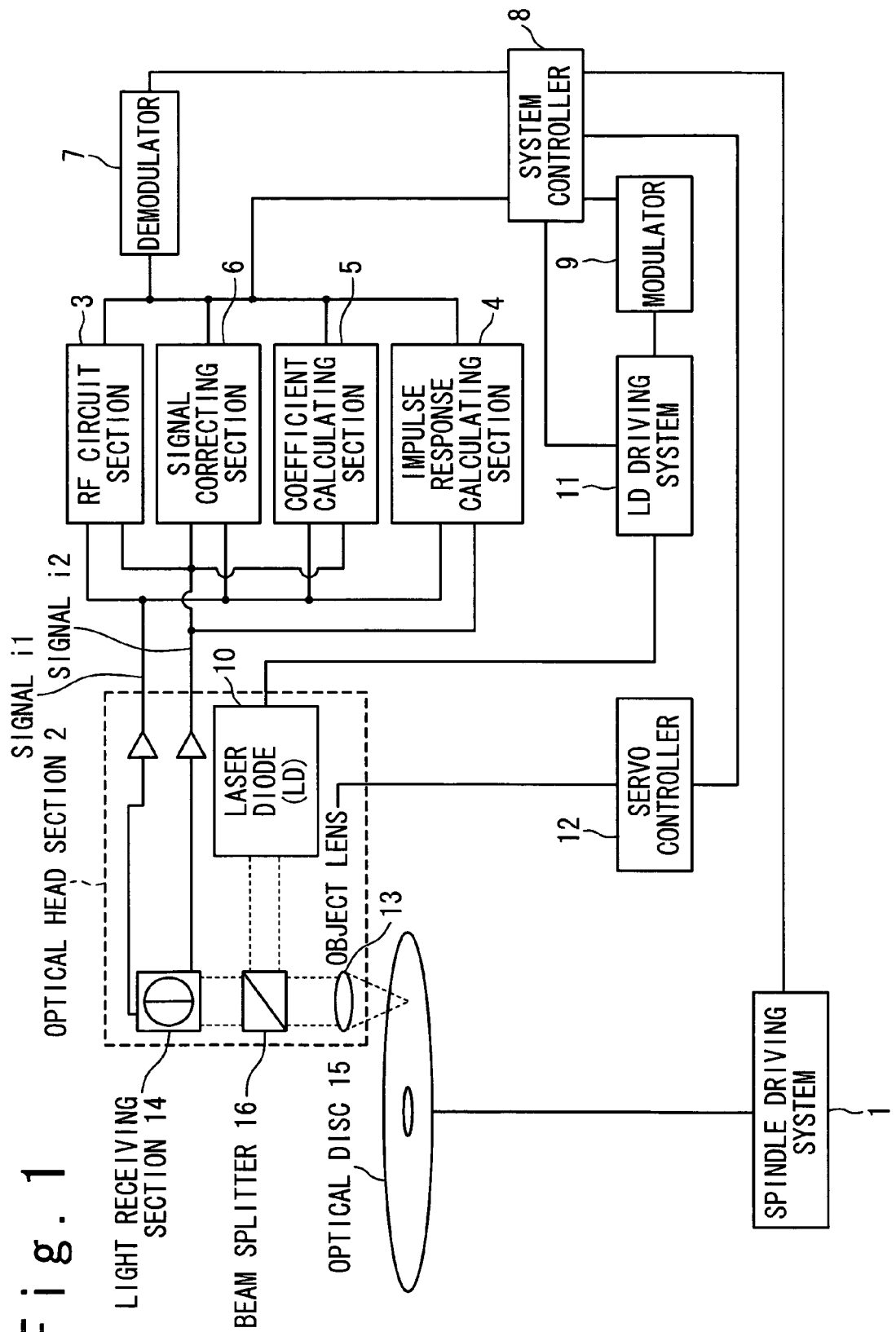
FIG. 1 is a block diagram showing the configuration of a data recording/reproducing apparatus according to a first embodiment of the present invention.
Figure 2:
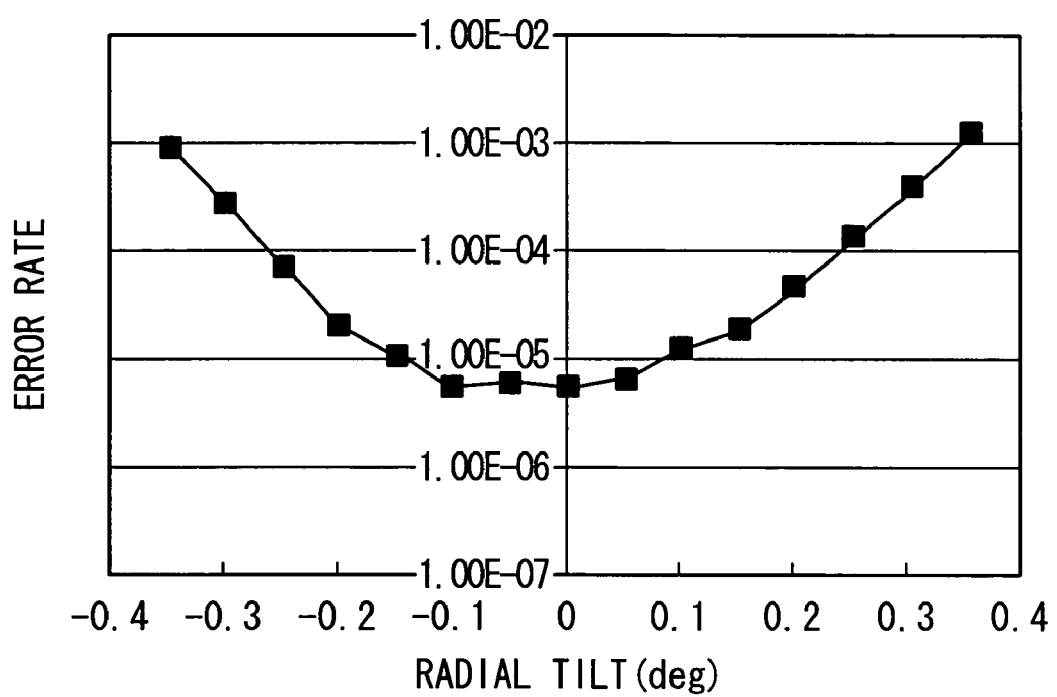
FIG. 2 is a diagram showing dependence of error rate on a radial tilt in a conventional example.

FIG. 1 is a schematic block diagram showing a data recording/reproducing apparatus to which the present invention is applied. This data recording/reproducing apparatus is composed of a spindle driving system 1 which drives an optical disc 15 such that it is rotated, an optical head section 2 which irradiates a laser beam to the optical disc 15 and detects a reflection beam. The optical head section 2 has a light receiving section 14, and a beam splitter 16, an object lens 13 and a laser diode (LD) 10, and generates signals $I_1$ and $I_2$ from the reflection beam. The beam splitter 16 supplies a portion of the laser beam from the laser diode 10 to the optical disc 15 through to the object lens 13 and the reflection beam from the optical disc 15 to the light receiving section 14.

The data recording/reproducing apparatus is further composed of an RF circuit section 3, an impulse response calculating section 4, a coefficient calculating section 5 and a signal correcting section 6. The RF circuit section 3 carries out various processes such as a filtering process to the signal supplied from the optical head section 2. The impulse response calculating section 4 calculates an impulse response of the signal supplied from the optical head section 2. The coefficient calculating section 5 calculates a coefficients k from the calculated impulse response and the signals supplied from the optical head section 2. The signal correcting section 6 generates a tilt correction signal by using the signals outputted from the optical head section 2 and the calculated coefficients k. The RF circuit section 3 corrects the signals outputted from the optical head section 2 in response to the tilt correction signal.

The data recording/reproducing apparatus is further composed of a demodulator 7 which demodulates a signal outputted from the RF circuit section 3, an LD driving system which drives the laser diode, a modulator 9 which modulates a signal to be recorded and the LD driving system 11 based on the modulated signal, and a servo controller 12.

The data recording/reproducing apparatus is further composed of a system controller 8 which controls the whole apparatus. Especially, the system controller 8 controls the spindle driving system 1 to rotate the optical disc 15. Also, the system controller 8 controls the modulator 9 to modulate the signal to be recorded and controls the demodulator to demodulate a reproduction signal from the RF circuit section 3. Moreover, the system controller 8 controls the operation of the LD driving system 11.

In the data recording/reproducing apparatus shown in FIG. 1, a 2-divided photo detector as the light receiving section 14 is used in which a detection area is divided into two, i.e., an inner detection area and an outer detection area with respect to a direction perpendicular to the radial direction. The inner detection area detects a portion of the reflection light beam and outputs a signal $I_1'$, and the outer detection area detects a portion of the reflection light beam and outputs a signal $I_2'$. Generally, because the output of the light receiving section 14 is current, an IV amplifier is used to convert the current signals $I_1'$ and $I_2'$ into voltage signals $I_1$ and $I_2$. A summation of the signals $I_1$ and $I_2$ is a usual reproduction signal. In this embodiment, two kinds of signals $I_1$ and $I_2$ are used to correct the radial tilt. Of course, if the detection area of the light receiving section 14 may be divided into two areas with respect to the radial direction, signal degradation due to the tangential tilt can be corrected.

In the first embodiment, the 2-divided photo detector is used. However, a 4-divided photo detector shown in FIG. 3 may be used which has a light receiving section A 30a, a light receiving section B 30b, a light receiving section C 30c, and a light receiving section D 30d. In this case, signals from these light receiving sections are appropriately combined to generate the signals $I_1$ and $I_2$. In this way, various types of detectors may be used. In the present invention, the two signals are generated which have different ratios of a signal component and a noise component, and the tilt correction is carried out by evaluating these signal components and noise components. Therefore, if these operations can be carried out, any type of detector may be used, and a division method of the light receiving section is not limited to the above examples.

When a 2-divided photo detector is used, data recorded on the optical disc 15 is outputted as the signals detected by the two areas of the detector. Thus, the two kinds of signals $I_1$ and $I_2$ are generated independently. On the other hand, when the 4-divided detector is used, the data recorded on the optical disc 15 is outputted as four signals from the four divided areas of the detector. By combining every two of the four signals, the two kinds of signals $I_1$ and $I_2$ are generated.

Figure 11:
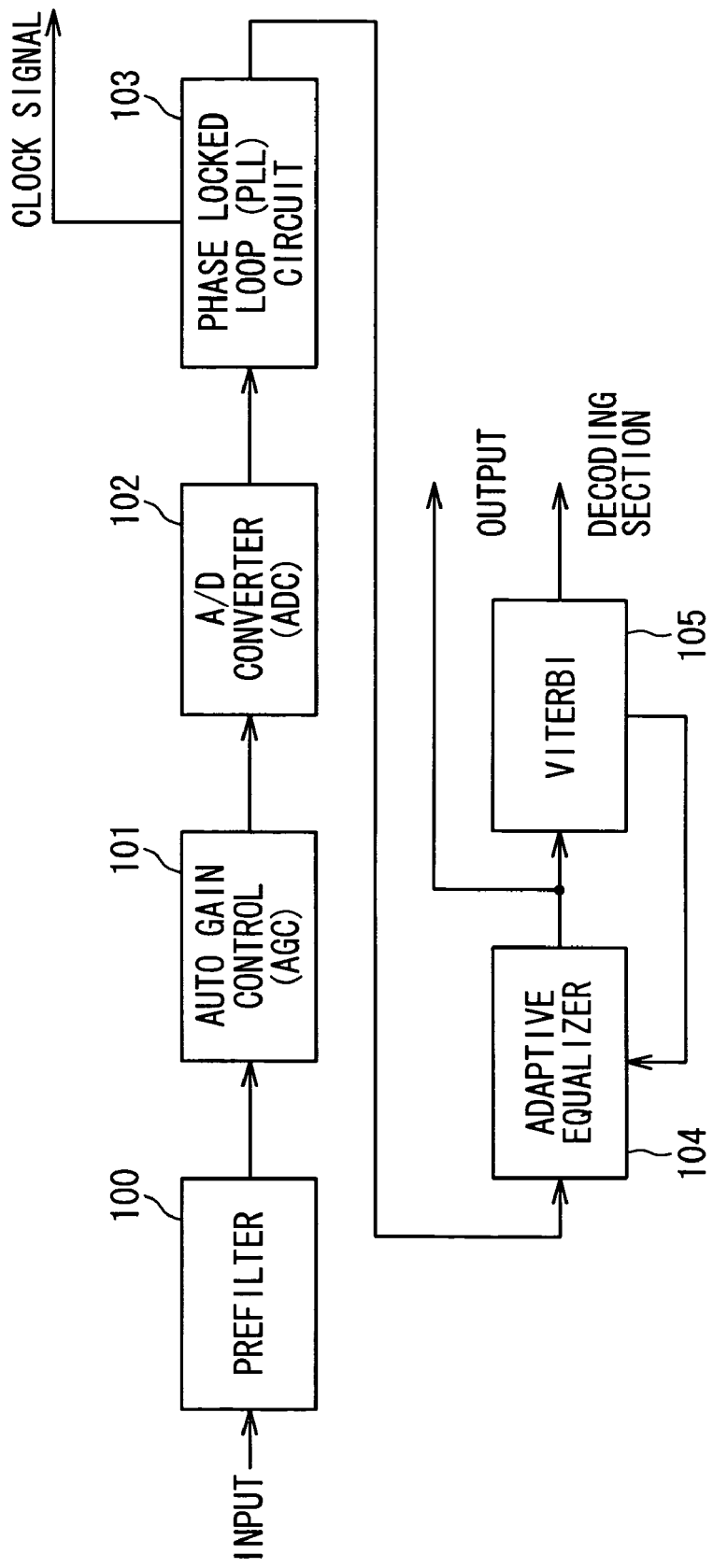
FIG. 11 is a block diagram showing an RF circuit section of the data recording/reproducing apparatus of the present invention.

After the signals $I_1$ and $I_2$ are supplied to the RF circuit section 3 and a summation of the signals $I_1$ and $I_2$ is calculated to produce a reproduction signal. Then, processes such as a filtering process, an equalizing process, and a phase locked looping (PLL) process are carried out. When PRML is used, a process such as the Viterbi decoding process is carried out. The block diagram of the RF circuit section 3 used in the first embodiment is shown in FIG. 11. The RF circuit section 3 is composed of a prefilter 100, an auto gain control (AGC) 101, an analog-to-digital converter (ADC) 102, a phase-locked loop (PLL) circuit 103, an adaptive equalizer 104 and a Viterbi decoding section 105.

A timing signal (clocks) generated by the PLL circuit, and an ideal waveform expected by the Viterbi decoder and so on are sent from the RF circuit section 3 to the impulse response calculating section 4. The impulse response calculating section 4 samples the signals $I_1$ and $I_2$ at the timing of the each clock, and calculates an impulse response of each of the signals $I_1$ and $I_2$ by comparing the ideal waveform expected by the Viterbi decoder and the sampled signals. When the RF circuit section 3 does not have the Viterbi decoder section 105, the calculation may be carried out by using a signal in which a data sequence is already known.

Thereafter, the calculated impulse responses are sent to the coefficient calculating section 5, and the coefficient calculating section 5 calculates the coefficients k. The equations used for the calculation will be described below. A noise component is calculated as a difference between a waveform calculated through a convolution integration of the data sequence and the impulse response and an actual signal waveform (signals $I_1$ and $I_2$ sampled at the timing of each clock). If the noise component at each clock is calculated, the expected values of various types of noises can be simply calculated. As the data sequence, a data sequence outputted from a Viterbi decoder is used when the RF circuit section 3 has the Viterbi decoder section 105, and a data sequence which is already known when the RF circuit section 3 does not have the Viterbi decoder section 105.

When the coefficient k can be calculated, the coefficient k is sent to the signal correcting section 6 and the calculation of the equation of $(I_1+I_2)+k*(I_1-I_2)$ is carried out for every clock and a correction signal is generated. The correction signal obtained in this way is supplied to the adaptive equalizer 104 of the RF circuit section 3, and the adaptive equalizer 104 carries out an equalizing process. The reproduction signal is generated from the output from the adaptive equalizer 104, as in a conventional apparatus.

In this embodiment, the coefficient k is calculated at a timing of the reproduction, and when the coefficient k is calculated, the calculation result of the equation of $(I_1+I_2)+k*(I_1-I_2)$ is supplied to the adaptive equalizer 104 to a timing when the coefficient k is next calculated. At that time, the output signal from the PLL circuit of FIG. 11 is not supplied to the adaptive equalizer 104 but to the signal correcting section 6. The adaptive equalizer 104 filters the waveform of a signal of the calculation result of the equation of $(I_1+I_2)+k*(I_1-I_2)$ to approach the signal waveform to an ideal signal waveform. If the configuration of the apparatus is modified, it is possible to feed back the coefficient k in real time.

Figure 3:
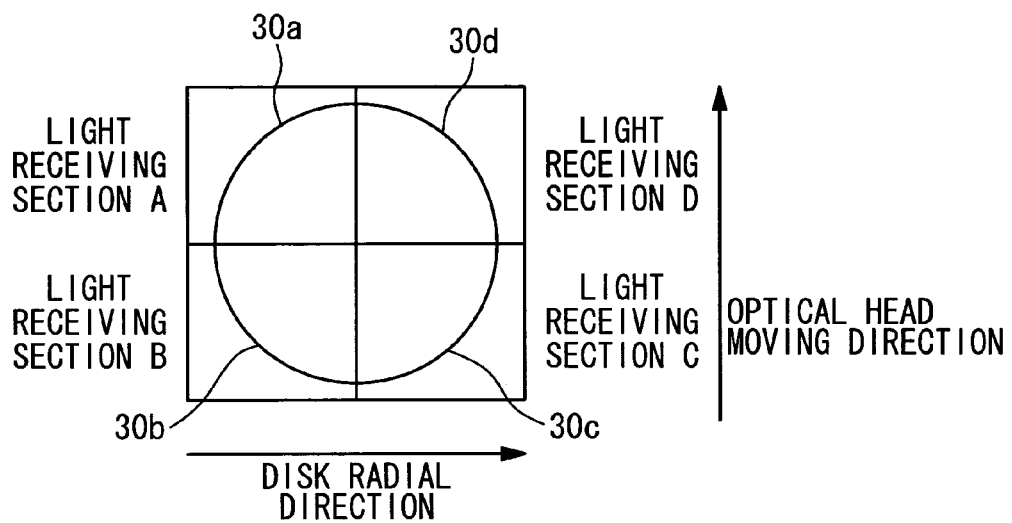
FIG. 3 is a block diagram showing a 4-divided light detecting section.

Next, operations of the impulse response calculation section will be described. FIG. 3 shows a 4-divided photo detector (PD) used as a light receiving section for a usual optical disc. It is supposed that a radial tilt is caused, and tilt detection and a correction of signal degradation by the tilt are considered. In this case, a summation of outputs from the light receiving sections A and B is used as a signal $I_1$ and a summation of outputs from the light receiving section C and D is used as a signal $I_2$. Supposing that an impulse response of the signal $I_1$ is expressed by the following equation (17)

$$\sum_{i}^{N} h_{1i} \quad (17)$$

(N is a natural number and i is time in units of clocks), and an impulse response of the signal $I_2$ is expressed by the following equation (18)

$$\sum_{i}^{N} h_{2i} \quad (18)$$

(N is a natural number and i is time in units of clocks). The signals $I_1$ and $I_2$ at a time m can be expressed by the following equation (19)

$$I_{1m} = \sum_{i}^{N} \alpha_{m-i} \times h_{1i} + n_{1m}, \quad I_{2m} = \sum_{i}^{N} \alpha_{m-i} \times h_{2i} + n_{2m} \quad (19)$$

where $\alpha$ is a data sequence and n is noise. This equation shows that a signal is obtained by adding noise to the convolution integration of the data sequence and the impulse response.

Next, operations of the coefficient calculating section 5 will be described. Because a usual reproduction signal is expressed as $I_1+I_2$, an SNR (signal noise ratio) of the reproduction signal is expressed by the following equation (20)

$$SNR_1 = \frac{\|h_1 + h_2\|^2}{E[n_1 + n_2]^2} = \frac{\sum_i^N q_i^2}{\sigma_1^2 + \sigma_2^2 + 2\sigma_{12}}, \; q_i = h_{1i} + h_{2i} \quad (20)$$

where E is an expected value, $\sigma_1$ is an expected value of the noise in the signal $I_1$, $\sigma_2$ is an expected value of the noise in the signal $I_2$, and $\sigma_{12}$ is an expected value of a noise correlation (a product of $n_1$ and $n_2$ every time) in the signals $I_1$ and $I_2$.

On the other hand, the SNR of a signal $\{(I_1+I_2)+k*(I_1-I_2)\}$ in the signal correcting process of the present invention is expressed by the following equation (21)

$$SNR_2 = \frac{\|(1+k)h_1 + (1-k)h_2\|^2}{E[(1+k)n_1 + (1-k)n_2]^2} \quad (21)$$

$$= \frac{\sum_i^N (q_i^2 + k^2 r_i^2 + 2kq_i r_i)}{(1+k)^2 \sigma_1^2 + (1-k)^2 \sigma_2^2 + 2(1-k^2)\sigma_{12}}$$

$$r_i = h_{1i} - h_{2i}$$

A difference $\Delta SNR$ between the $SNR_1$ of the usual reproduction signal and the $SNR_2$ of the signal in the signal correcting process of the present invention is expressed by the following equation (22)

$$\Delta SNR = SNR_2 - SNR_1 \quad (22)$$

$$= \frac{k^2\left((\sigma_1^2 + \sigma_2^2)\left(\sum_i^N (r_i^2 - q_i^2)\right)\right) + 2\sigma_{12}\left(\sum_i^N (r_i^2 + q_i^2)\right)}{\left(\sigma_1^2 + \sigma_2^2 + 2\sigma_{12})((1+k)^2\sigma_1^2 + (1-k)^2\sigma_2^2 + 2(1-k^2)\sigma_{12}\right)} +$$

$$\frac{2k\left(\left(\sum_i^N q_i r_i\right)(\sigma_1^2 + \sigma_2^2 + 2\sigma_{12}) - \left(\sum_i^N q_i\right)^2 (\sigma_1^2 - \sigma_2^2)\right)}{\left(\sigma_1^2 + \sigma_2^2 + 2\sigma_{12})((1+k)^2\sigma_1^2 + (1-k)^2\sigma_2^2 + 2(1-k^2)\sigma_{12}\right)}$$

Generally, since the square of the noise is larger than the correlation of the noise and $r_i$ is smaller than $q_i$, the first term of the numerator takes a negative value. Therefore, the numerator is a secondary function with a local maximal point with respect to the coefficient k. Thus, it could be understood that SNR can be improved by setting a proper value to the coefficient k. When the above equation is differentiated and solved with respect to the coefficient k, the following equation (23) is obtained.

$$k = \frac{-\left((\sigma_1^2 + \sigma_2^2 + 2\sigma_{12})\left(\sum_i^N r_i q_i\right) - (\sigma_1^2 - \sigma_2^2)\left(\sum_i^N q_i^2\right)\right)}{(\sigma_1^2 + \sigma_2^2)\left(\sum_i^N (r_i^2 - q_i^2)\right) + 2\sigma_{12}\left(\sum_i^N (r_i^2 + q_i^2)\right)} \quad (23)$$

The SNR is most improved when the coefficient k is set to this value.

Also, since the coefficient k has a positive polarity or a negative polarity depending on the signals $I_1$ and $I_2$, the coefficient k correlates directly with the tilt, if the signals $I_1$ and $I_2$ are selected in such a manner that the balance of both the signals changes linearly with respect to the tilt. Thus, how the tilt changes can be immediately detected.

In the above-mentioned description, the SNR in a usual detection system is used. However, in the same way, the present invention can be applied to PRML (Partial Response Maximum Likelihood) detection which is used in recent years. As proposed by the inventors of the present invention in International Symposium Optical Memory 2003 (ISOM 2003) ("Signal-to-Noise Ratio in a PRML Detection" by S. OHKUBO et al., Technical Digest pp. 164-165), PRSNR, i.e., the SNR in a PR system which carries out reproduction of data by using PRML can be estimated for the PR system by using an inner product of a vector $\epsilon$ indicating a difference between paths and the above noise n as an expected value, and the inner product is expressed by the following equation (24)

$$\sum_m \varepsilon_m n_m \quad (24)$$

where m is a time in units of clocks. Therefore, when the PR system is used, the coefficient k for the optimal SNR in the PR system can be calculated, if an expected value of the above equation (24) is calculated by using the vector $\epsilon$ indicating a difference between the paths which are a neck of the system and in which Euclid distance is short, and the expected value is substituted for the above $\sigma$. Here, the difference between the paths indicates the difference between time sequences of the signal levels. For example, if the difference between the path is calculated from a time sequence of five signal levels of (−4, −3, −1, 1, 3) and a time sequence of five signal levels of (−3, −1, 1, 3, 4), the difference between both of the time sequences is (1, 2, 2, 2, 1) or (−1, −2, −2, −2, −1). The distance of the difference between these time sequences is a vector distance called Euclid distance. In this case, 1*1+2*2+2*2+2*2+1*1=14.

Also, as proposed by the inventors of the present invention in ISOM 2003, when there are a plurality of paths which are the neck of the system and in which the Euclid distance is short, a expressed value of the above equation (24) is calculated between the paths of each pair, and then normalized by using the Euclid distance, and the largest one of the obtained expected values may be substituted for the above $\sigma$.

Also, an approximation of the above coefficient k can be found by using PRSNR itself as SNR of the PRML system which is shown by the inventors of the present invention in ISOM 2003. The PRSNR is defined as an SNR of the PRML system and indicates a value of the paths in which a value of the following equation (25) is smallest, when the following equation (25) is calculated to paths which are the neck of the system and in which the Euclid distance is short, and when there are a plurality of paths which are the neck of the system and the following equation (25) is calculated to paths of each pair which are the neck of the system, $$\frac{\left(\sum_m \varepsilon_m^2\right)^2}{E\left[\left(\sum_m \varepsilon_m n_m\right)^2\right]} \tag{25}$$

where E[ ] is an expected value. The expected value is a value of the above equation (24) at each time, and the expected value could be thought as an average. The numerator of the equation (25) is indeed the Euclid distance between the paths. Even when there are a plurality of paths of the neck, the Euclid distance does not vary so much among the plurality of paths. Therefore, if a reciprocal of the PRSNR can be substituted for the square of σ.

Also, when it is expected that the impulse responses of the signals $I_1$ and $I_2$ do not vary so much, the present invention can be carried out under approximation that the impulse responses are same ($r_i$=0), by using the relatively simple coefficient k expressed by the following equation (26)

$$k = \frac{(\sigma_1^2 - \sigma_2^2)}{2\sigma_{12} - (\sigma_1^2 + \sigma_2^2)} \tag{26}$$

Moreover, if it is estimated that the correlation of the noise is low, the present invention can be achieved by using the coefficient k expressed by the following equation (27).

$$k = \frac{(\sigma_1^2 - \sigma_2^2)}{(\sigma_1^2 + \sigma_2^2)} \tag{27}$$

When the above-mentioned PRSNR is used instead of the square of σ, the denominator of the above equation (27) may be substitute by a reciprocal of PRSNR to a summation of the signals $I_1$ and $I_2$ (a total RF signal).

When the precision of the tilt is enough even if the above-mentioned approximation is used, a circuit for calculating the impulse response and a circuit for calculating noise correlation can be omitted. It is sufficient to select and use the optimal equation of the coefficient k in consideration of a balance of tilt detection precision and the scale of an LSI.

There is a very strong correlation between the signal quality and the above PRSNR. Therefore, if a unit for calculating PRSNR is mounted on an LSI, the LSI is more valuable. From the above reason, when tilt correction should be carried out while the PRSNR is calculated, the PRSNR may be calculated by the PRSNR calculating unit and a value calculated from the following equation (28) by using the calculated PRSNRs may be used as the coefficient k, $$k = \frac{PRSNR_2 - PRSNR_1}{PRSNR} \tag{28}$$

where $PRSNR_1$ and $PRSNR_2$ are PRSNRs of the signals $I_1$ and $I_2$, respectively, and PRSNR is PRSNR of the summation of the signals $I_1$ and $I_2$ (a total RF signal) Besides, a summation of $PRSNR_1$ and $PRSNR_2$ may be used as a denominator. In such a system, the PRSNR with high correlation with the signal may be used for various applications. It should be noted that when the PRSNR is used as mentioned above, the actual calculation of the circuit for calculating an impulse response is stopped, and (1,2,2,2,1) is outputted as an ideal impulse response assumed in this way. The reason is in that it is already assumed that the impulse response is (1,2,2,2,1) when the PRSNR is calculated. Or, the circuit for calculating the impulse response can be omitted. It is consequential that when a tilt is corrected, it is necessary to invert the polarity of the above coefficient k depending on how to set the positive/negative of the tilt.

Also, for example, the coefficient k is calculated from the following equation (29) or (30)

$$k = \frac{SNR2 - SNR1}{SNR3} \tag{29}$$

$$k = \frac{SNR2 - SNR1}{SNR1 + SNR2} \tag{30}$$

Each of the SNR1, the SNR2, and the SNR3 may be calculated from the above equation (25). Also, in this case, each of the SNR1, the SNR2, and the SNR3 may be selected as the least value among results of the equation (25) when the vector ϵ takes the following ϵ1, ϵ2, and ϵ3,

ϵ1=(1, 2, 2, 2, 1)

ϵ2=(1, 2, 1, 0, −1, −2, −1), and

ϵ3=(1, 2, 1, 0, 0, 0, 1, 2, 1),

Also, each of the SNR1, the SNR2, and the SNR3 may be a PRSNR as an SNR of a PR system which carries out signal reproduction using PRML to the first signal $I_1$, the second signal $I_2$, and a summation of the first and second signals $I_1$ and $I_2$.

Also, the reproducing step may be achieved by carrying out a calculation of $I_1+I_2+k*(I_1-I_2)$ by using the coefficient k, and the first and second signals $I_1$ and $I_2$ to produce a calculation resultant signal; and by reproducing the reproduction signal from the first and second signals $I_1$ and $I_2$ by using the calculation resultant signal.

Figure 4:
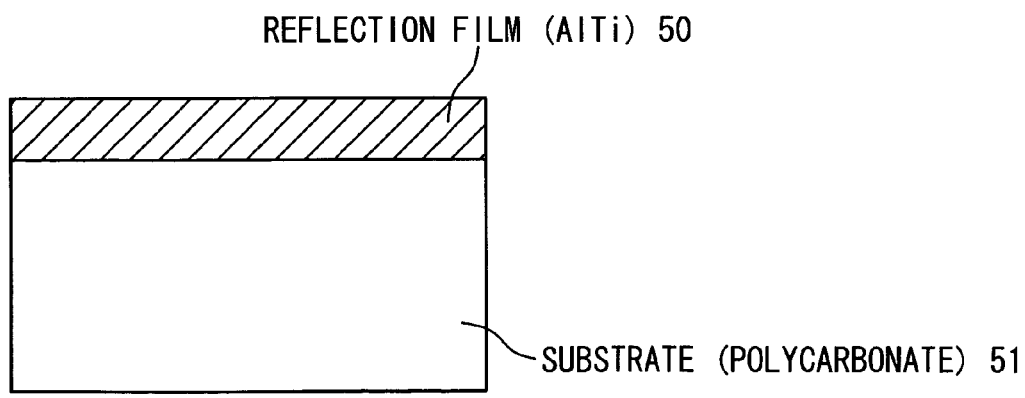
FIG. 4 is a cross sectional view of a Read-only medium (disc) used in the first embodiment of the present invention.

Next, the results of the signal correcting process in the first embodiment will be described. An optical head section 2 with the LD wavelength of 405 nm, and the numerical aperture (NA) of 0.65 was used. Also, an RF circuit section 3 with the Viterbi decoder section 105 for PR (12221) was used. An optical disc with the emboss formed on a polycarbonate substrate of 120-mm diameter and 0.6-mm thickness to have the bit pitch of 0.153 μm, and the track pitch of 0.4 μm was used. FIG. 4 shows a cross section the optical disc 15 used in the first embodiment. An AlTi film on the substrate 51 is used as a reflection film 50. Also, the light beam is inputted to pass through the substrate 51.

Figure 5:
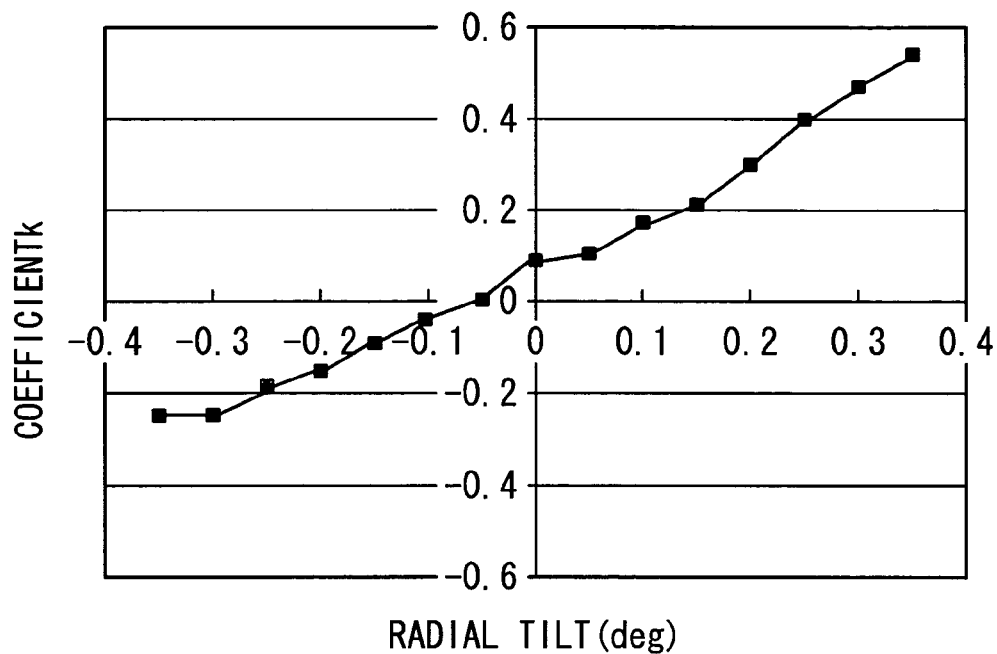
FIG. 5 is a graph showing dependence of a coefficient k on radial tilt in the first embodiment of the present invention.

FIG. 5 shows a stationary measuring result of a relation of a radial tilt and the coefficient k in an optical disc 15 in which the radial tilt is intentionally caused in the position of 30 mm in a radial direction in the data recording/reproducing apparatus shown in FIG. 1. It could be seen from FIG. 5 that the radial tilt and coefficient k relate linearly to each other.

Figure 6:
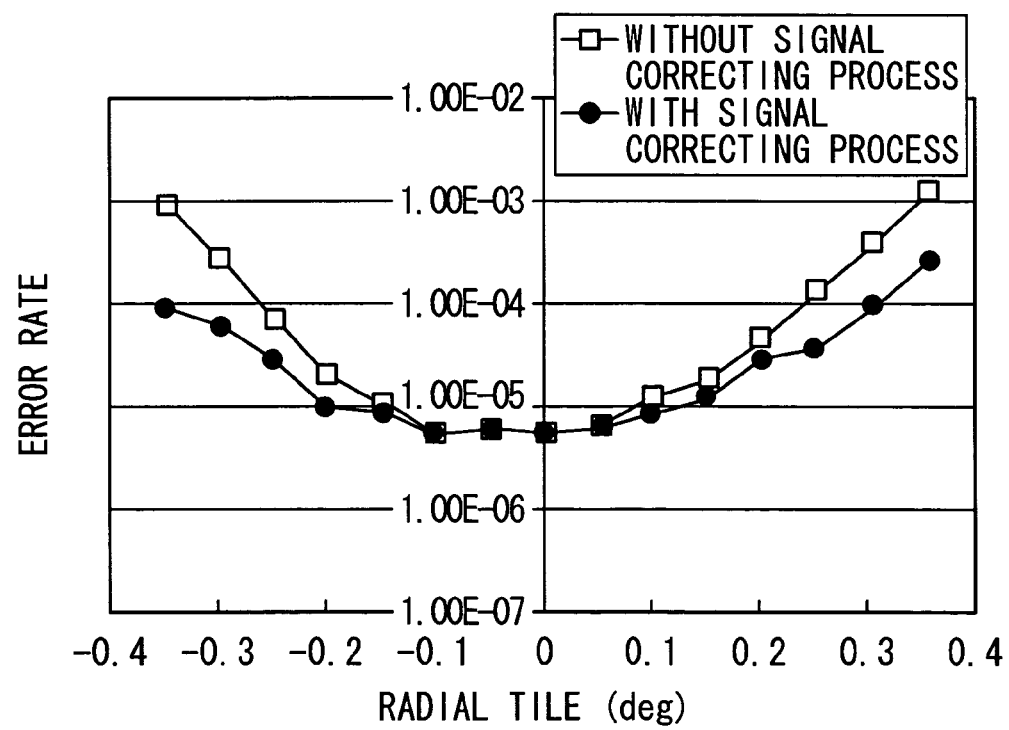
FIG. 6 is a diagram showing a relation of the radial tilt and the error rate in case of no signal correction and a relation of the radial tilt and the error rate in case of signal correction in the first embodiment.

Also, FIG. 6 shows a difference between error rate in a case where a signal correcting process is carried out using the coefficient obtained by the signal correcting section 6 and error rate in a case where the signal correcting process is not carried out. It could be seen from FIG. 6 that the error rate increases largely when the radial tilt is caused, whereas degradation is suppressed by carrying out the signal correcting process.

Next, a practical example in the data recording/reproducing apparatus of the present invention will be described.

Figure 7:
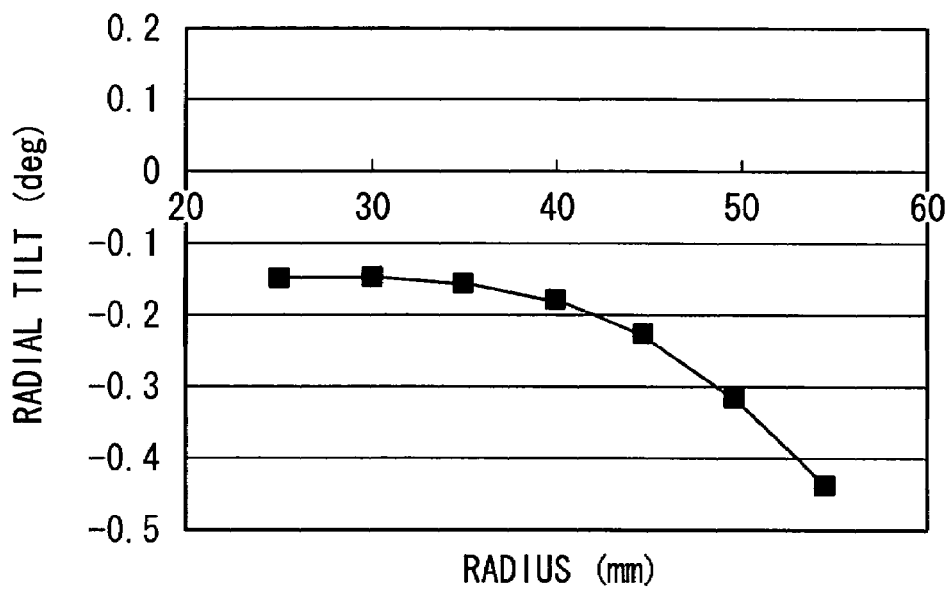
FIG. 7 is a diagram showing dependence of the radial tilt on the radius in the Read-only medium (disc) used in the first embodiment of the present invention.

FIG. 7 shows a dependence of the radial tilt on the radius of the optical disc used in this embodiment. The radial tilt in the position equal to or more than 50 mm in the radial direction exceeds −0.3 degrees and the large increase of the error rate is worried. Also, as shown with FIG. 7, since the radial tilt is caused in the innermost disc position (about −0.15 degrees in this case) in the data recording/reproducing apparatus, the improvement of a radial tilt margin is strongly requested.

Figure 8:
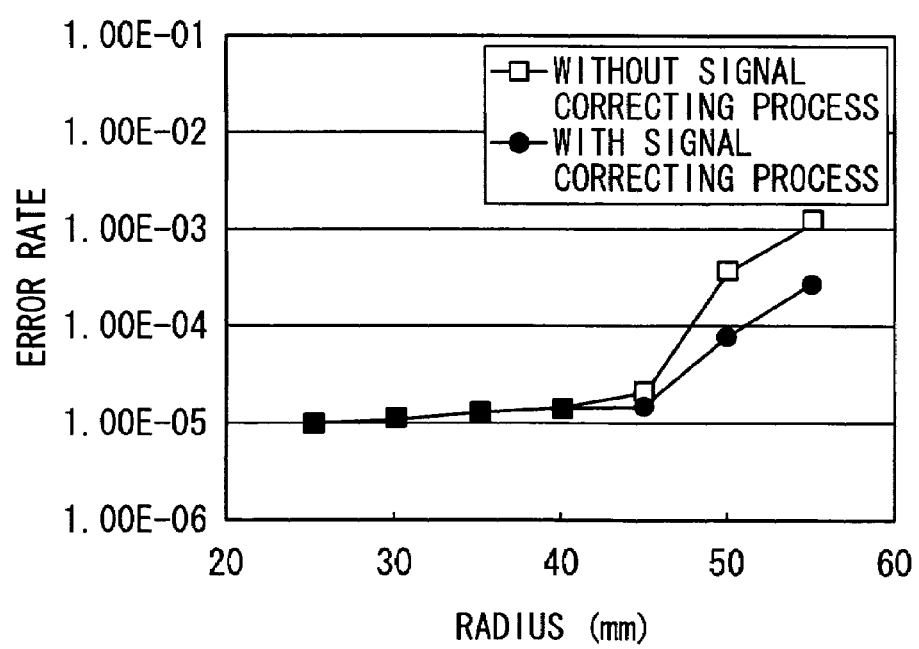
FIG. 8 is a diagram showing dependence of error rate on radius in the Read-only medium (disc) in case of no signal correction and dependence of error rate on radius in case of signal correction in the data recording/reproducing apparatus according to the first embodiment of the present invention.

FIG. 8 shows the dependence of the error rate on the radius in case that the signal correcting process of the present invention is carried out and in case that the signal correcting process of the present invention is not carried out, when the optical disc 15 is inserted in the data recording/reproducing apparatus in the first embodiment. As seen from FIG. 8, it is possible to suppress the degradation of the error rate in the peripheral section of the disc when the signal correcting process of the present invention is carried out. In other words, it can be confirmed that the quality margin of the reproduction signal can be improved by using the data recording/reproducing apparatus of the present invention.

Second Embodiment

Figure 9:
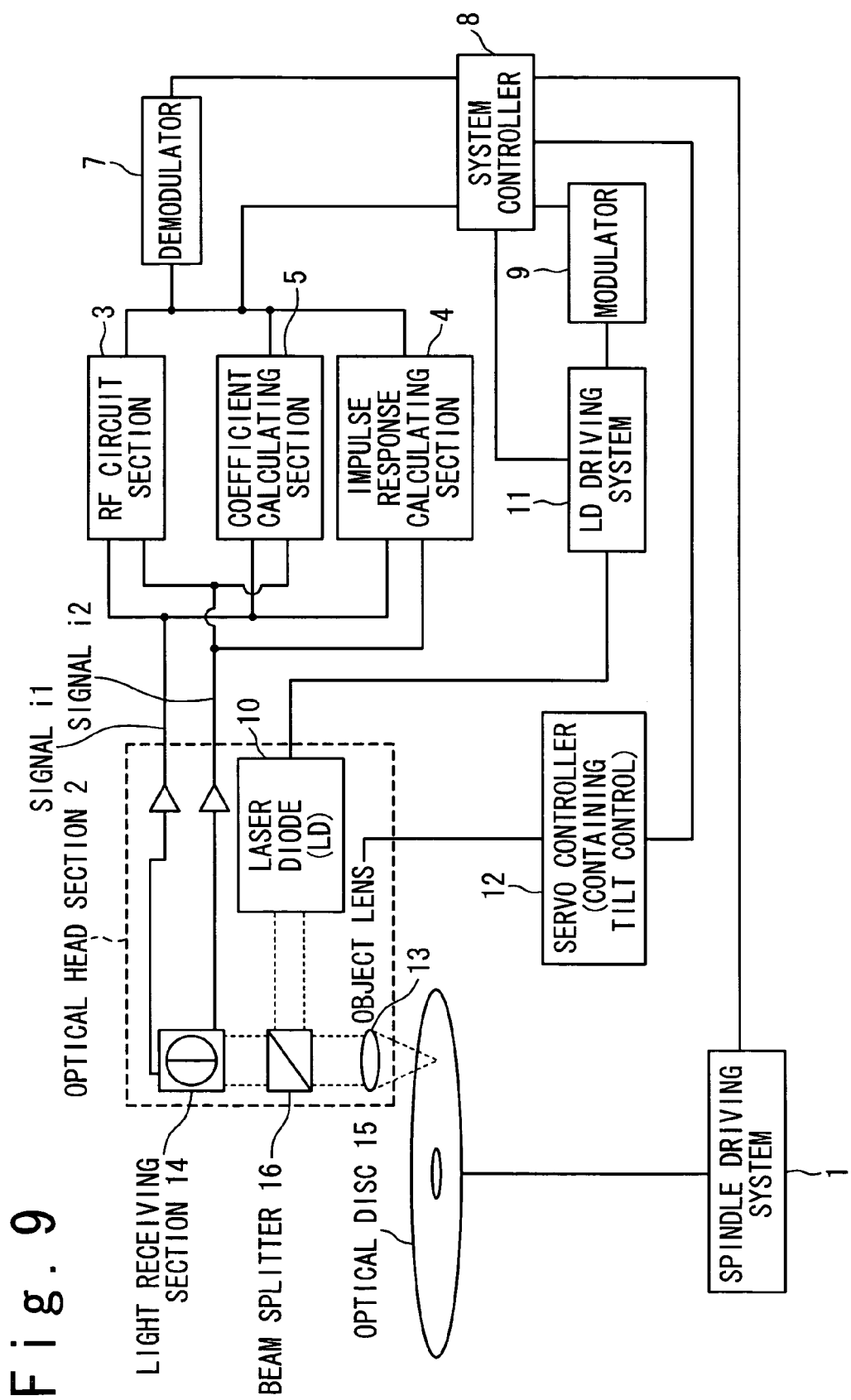
FIG. 9 is a block diagram showing the configuration of the data recording/reproducing apparatus according to a second embodiment of the present invention.

FIG. 9 shows the data recording/reproducing apparatus according to the second embodiment of the present invention. The second embodiment is different from the first embodiment in that the tilt is dynamically corrected using a linear relation between the coefficient and the tilt in the second embodiment, while the reproduction signal is corrected using the calculated coefficient k in the first embodiment. Therefore, the signal correcting section 6 in embodiment 1 does not exist in the second embodiment, and the tilt can be dynamically corrected through the servo controller 20.

The operation until the coefficient k is calculated by using the signals $I_1$ and $I_2$ is the same as that of the first embodiment. In the second embodiment, the calculated coefficient k is sent to the system controller 8. The system controller 8 controls the servo controller 12 such that the coefficient k goes toward "0", since the coefficient k has the linear relation to the tilt. The servo technique is the control technique in which a difference is corrected by using a signal which is correlated with the difference. In the optical disc technique, there are used a tracking servo technique which corrects a shift from a guidance ditch, and a focus servo technique which corrects a distance between the optical disc and the optical head, i.e., a focus position. In the second embodiment, the tilt servo technique is adopted in the servo controller 12 to control the tilt of the optical head, in addition to above servo techniques. Thus, the tilt is corrected for the coefficient k to go toward 0. The fact that the tilt servo control is carried such that the coefficient k goes toward "0" means that a tilt is always controlled to an optimal tilt, as shown in FIG. 5.

Figure 10:
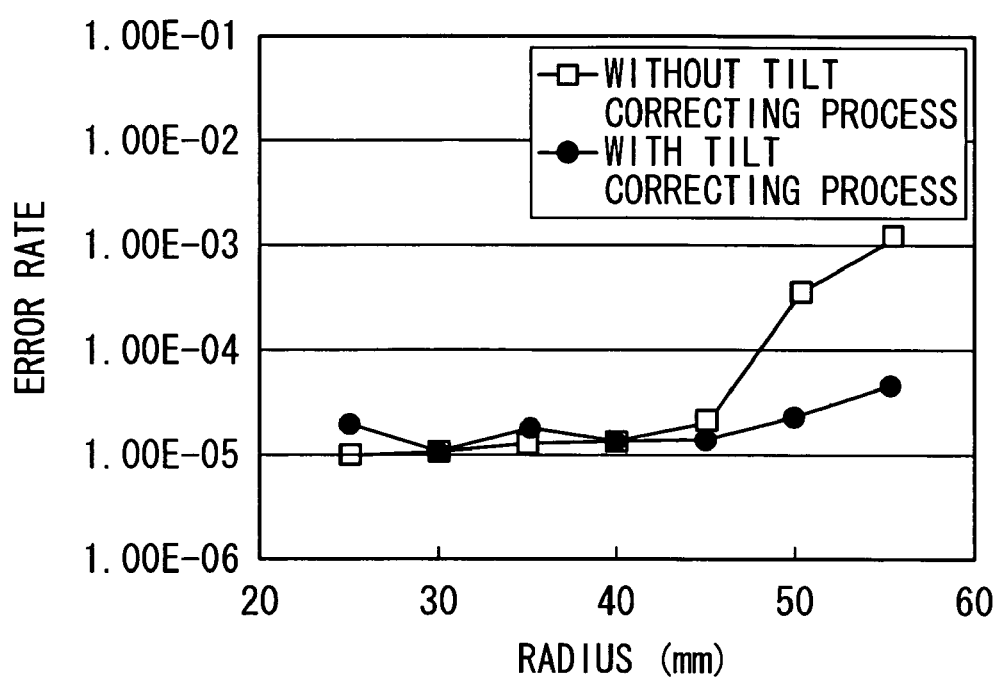
FIG. 10 is a diagram showing dependence of the error rate on the radius in case of no tilt correction and dependence of the error rate on the radius in case of tilt correction in the data recording/reproducing apparatus according to the second embodiment of the present invention.

The optical disc which is the same as in the first embodiment is inserted into the data recording/reproducing apparatus in the second embodiment, and the dependence of the error rate on the radius is tested. The result is shown in FIG. 10. It is possible to suppress the degradation of the error rate in the periphery section like the first embodiment. It was confirmed that it was possible to largely improve the quality margin of the reproduction signal in the data recording/reproducing apparatus.

Third Embodiment

Figure 12:
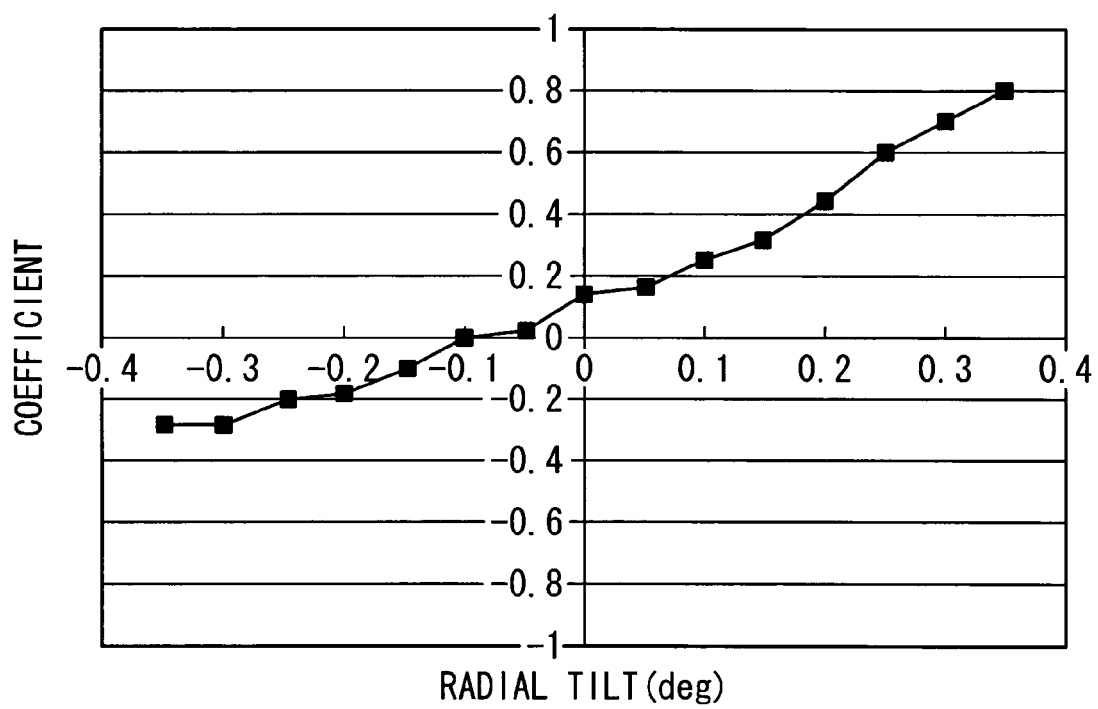
FIG. 12 is a graph showing dependence of a coefficient k on the radial tile in a third embodiment of the present invention.

The data recording/reproducing apparatus according to the third embodiment of the present invention will be described. The configuration of the data recording/reproducing apparatus in the third embodiment is mainly the same as that of the second embodiment shown in FIG. 11. However, the third embodiment is different from the second embodiment in the operations of the impulse response calculating section 4 and the coefficient calculating section 5. In the third embodiment, the coefficient k is calculated using PRSNR. Therefore, an ideal impulse response (1,2,2,2,1) is outputted from the impulse response calculating section 4. The coefficient calculating section 5 calculates the coefficient k by using the above equation (28). Of course, the coefficient calculating section 5 can calculate PRSNR. In the third embodiment, the same experiment as shown in FIG. 5 was carried out using the same optical disc 15 and the same radius position. The result is shown in FIG. 12. The value of the coefficient k is rather different from that shown in FIG. 5 but the position where the coefficient k is 0 is approximately the same. It could be understood that it is possible to correct the radial tilt by the method of the third embodiment. In the third embodiment, the same optical disc as in the first embodiment is inserted in the data recording/reproducing apparatus, and the dependence of the error rate on the radius is measured, like the second embodiment. The result was obtained which was similar to that of FIG. 10. It was confirmed that it was possible to largely improve the quality margin of the reproduction signal in the data recording/reproducing apparatus of the third embodiment. Because PRSNR is a value having a strong correlation with signal quality, there is a merit in which the signal quality can be always managed by monitoring PRSNR in case of the apparatus of the third embodiment. The PRSNR is monitored previously and the coefficient k is calculated when the value becomes equal to or less than a threshold, and then the tilt is corrected.

In the first and second embodiments, each of the impulse responses is calculated. However, when the impulse responses of both signals are previously expected, an ideal waveform is generated through the convolution integration of the expected impulse response and the data sequence. Then, the adaptable equalization may be carried out to the signals $I_1$ and $I_2$ based on the ideal waveform. In this case, because the difference between the ideal waveform and each of the signals $I_1$ and $I_2$ after the adaptable equalization at each time is a noise component, it is sufficient to calculate the expected value. When such an embodiment is adopted, it is a situation in which the impulse responses of the signals $_1$ and $I_2$ are the same approximately. Therefore, the coefficient k can be calculated by using the above simplest equation (27). Also, in this case, the impulse response calculating section 4 may be replaced by the adaptive equalizer.

In the above embodiments, the Read-only optical disc used as a recording medium. However, the present invention can be applied to a rewriting-type RAM medium. Also, the present invention is not limited only to the correction of the radial tilt and it is possible to correct the parameter for the balance of the output to be lost in the similar point of view.

Also, in the above embodiments, the correction is carried out to the reproduction signal. However, when a wobble is formed in a guidance groove of the RAM medium, the unbalance of the output due to the wobble is detected, and the radial tilt and the other parameter can be corrected as in the above embodiments. Of course, it is possible to suppress signal degradation due to the wobble through the signal correcting process.

Also, because it can be thought that the jitter which is conventionally used is a noise component, the jitter can be used instead of σ.

Also, the present invention is not limited to the 405-nm wavelength and NA of 0.6, and can be adaptable to all the wavelengths and NAs.

Also, in the above embodiments, the class of PR (12221) is used but the other classes such as PR (1221) can be used in the same way.

Also, in the above embodiments, the example in which PRML is used is described but the present invention can be applied to the system in which PRML is not used, in the same way.

In the above embodiments, the optical disc apparatus is described using the optical disc apparatus as an example. However, a method in which the signal correcting process or tilt correcting process is carried out based on a difference between the signal qualities detected by dividing the detecting area can be applied to an example in which the signal quality degradation is corrected depending on a tilt between the disc surfaces and the optical head section at the magnetic disc section, or an example of correcting an influence by the tilt of a head to a recording track in the magnetic disc, a magnetic tape apparatus and so on.

Also, in the above embodiment, an example of correcting the tilt is shown. However, the present invention can be applied to other characteristics such as defocusing and detracking, and so on through appropriately change so that the difference of the characteristic to be corrected can be detected in the same way.

Unlike the conventional example in which a tilt is corrected based on an indirect signal, the present invention obtains a tilt detection signal or a coefficient for tilt correction directly from a reproduction signal itself. Therefore, the change of the tilt can be detected from the reproduction signal in high precision. Also, the polarity of the coefficient k changes depending on the direction of the tilt. Therefore, the magnitude and direction of the tilt can be immediately detected. In other words, it is not necessary to use a mountain climbing method.

The present invention can be applied to be adaptable widely as a recording/reproducing apparatus and method for a high density disc, and it is possible to increase the reliability of the recording/reproducing apparatus remarkably.

What is claimed is:

1. A method of obtaining a reproduction signal with good quality from a data recording medium, comprising:

generating two actual signals as first and second signals $I_1$ and $I_2$ from detection signals obtained from said data recording medium;

calculating a coefficient k which has linear correlation with a tilt, based on said first and second signals $I_1$ and $I_2$; and reproducing a reproduction signal in which influence of said tilt is eliminated, by using said coefficient k and said first and second signals $I_1$ and $I_2$, wherein said calculating comprises:

calculating said coefficient k from the following equation (1)

$$k = \frac{-\left((\sigma_1^2 + \sigma_2^2 + 2\sigma_{12})\left(\sum_i^N r_i q_i\right) - (\sigma_1^2 - \sigma_2^2)\left(\sum_i^N q_i^2\right)\right)}{(\sigma_1^2 + \sigma_2^2)\left(\sum_i^N (r_i^2 - q_i^2)\right) + 2\sigma_{12}\left(\sum_i^N (r_i^2 + q_i^2)\right)} \quad (1)$$

where an impulse response of said first signal $I_1$ is expressed by the following equation (2)

$$\sum_i^N h_{1i} \quad (2)$$

(N is a natural number and i is a time in units of clocks), and an impulse response of said second signal $I_2$ is expressed by the following equation (3)

$$\sum_i^N h_{2i} \quad (3)$$

(N is a natural number and i is time in units of clocks), an expected value of noise of said first signal $I_1$ is $\sigma_1$, an expected value of noise of said second signal $I_2$ is $\sigma_2$, and an expected value of correlation of the noises of said first and second signals $I_1$ and $I2$ is $\sigma_{12}$, $q_i = h_{1i} + h_{2i}$, and $r_i = h_{1i} - h_{2i}$.

2. The method according to claim 1, wherein said reproducing comprises:

adjusting a tilt between a data recording medium and a data recording/reproducing apparatus by using said coefficient k; and reproducing said reproduction signal from said first and second signals $I_1$ and $I_2$.

3. A method of obtaining a reproduction signal with good quality from a data recording medium, comprising:

generating two actual signals as first and second signals $I_1$ and $I_2$ from detection signals obtained from said data recording medium;

calculating a coefficient k which has linear correlation with a tilt, based on said first and second signals $I_1$ and $I_2$; and reproducing a reproduction signal in which influence of said tilt is eliminated, by using said coefficient k and said first and second signals $I_1$ and $I_2$, wherein said calculating comprises:

calculating said coefficient k from the following equation (4)

$$k = \frac{(\sigma_1^2 - \sigma_2^2)}{2\sigma_{12} - (\sigma_1^2 + \sigma_2^2)} \quad (4)$$

where an expected value of noise of said first signal $I_1$ is $\sigma_1$, an expected value of noise of said signal $I_2$ is $\sigma_2$, and an expected value of correlation of the noises of said signals $I_1$ and $I_2$ is $\sigma_{12}$.

4. A method of obtaining a reproduction signal with good quality from a data recording medium, comprising:

generating two actual signals as first and second signals $I_1$ and $I_2$, from detection signals obtained from said data recording medium;

calculating a coefficient k which has linear correlation with a tilt based on said first and second signals $I_1$ and $I_2$;

reproducing a reproduction signal in which influence of said tilt is eliminated, by using said coefficient k and said first and second signals $I_1$ and $I_2$, wherein said calculating comprises:
calculating said coefficient k from the following equation (5)

$$k = \frac{(\sigma_1^2 - \sigma_1^2)}{(\sigma_1^2 + \sigma_2^2)} \quad (5)$$

where an expected value of noise of said signal $I_1$ is $\sigma_1$, and an expected value of noise of said signal $I_2$ is $\sigma_2$.

5. A method of obtaining a reproduction signal with good quality from a data recording medium, comprising:
generating two actual signals as first and second signals $I_1$ and $I_2$ from detection signals obtained from said data recording medium;
calculating a coefficient l which had linear correlation with a tilt, based on said first, and second signals $I_1$ and $I_2$; and
reproducing a reproduction signal in which influence of said tilt is eliminated, by using said coefficient k and first and second signals $I_1$ and $I_2$,
wherein said calculating comprises:
calculation said coefficient k from the following equation (6) or (7)

$$k = \frac{SNR2 - SNR1}{SNR3} \quad (6)$$

$$k = \frac{SNR2 - SNR1}{SNR1 + SNR2} \quad (7)$$

wherein SNR1 is a ration of a signal component and a noise component of said first signal $I_1$, SNR2 is a ratio of a signal component and a noise component of said second signal $I_2$, and SNR3 is a ratio of a signal component and a noise component of a signal $I_1 + I_2$ obtained by adding said first and second signals $I_1$ and $I_2$.

6. The method according to claim 5, wherein said calculating comprises:
calculating each of said SNR1, said SNR2, and said SNR3 from the following equation (8)

$$\frac{\left(\sum_m \varepsilon_m^2\right)^2}{E\left[\left(\sum_m \varepsilon_m n_m\right)^2\right]} \quad (8)$$

expressed by a vector $\varepsilon$, the noise n indicating a difference between an ideal signal waveform and a waveform of said actual signal, and a symbol E[ ] indicating an expected value.

7. The method according to claim 6, wherein each of said SNR1, said SNR2, and said SNR3 is selected as the least value among results of said equation (8) when said $\varepsilon$ vectors takes the following $\varepsilon1$, $\varepsilon2$, and $\varepsilon3$,
$\varepsilon1 = (1,2,2,2, 1)$
$\varepsilon2 = (1,2,1,0,-1,-2,-1)$, and
$\varepsilon3 = (1,2, 1, 0, 0, 0, 1, 2, 1)$.

8. The method according to claim 5, wherein each of said SNR1, said SNR2, and said SNR3 is a PRSNR as an SNR of a PR system which carries out signal reproduction using PRML to said first signal $I_1$, said second signal $I_2$, and a summation of said first and second signals $I_1$ and $I_2$.

9. A method of obtaining a reproduction signal with good quality from a data recording medium, comprising:
generating two actual signals as first and second signals $I_1$ and $I_2$ from detection signals obtained from said data recording medium;
calculating a coefficient k which has linear correlation with a tilt, based on said first and second signals $I_1$ and $I_2$; and
reproducing a reproduction signal in which influence of said tilt is eliminated, by using said coefficient k and said first and second signals $I_1$ and $I_2$,
wherein said reproducing comprises:
carrying out a calculation of $I_1 + I_2 + k^*(I_1 - I_2)$ by using said coefficient k, and said first and second signals $I_1$ and $I_2$ to produce a calculation resultant signal; and
reproducing said reproduction signal by using said calculation resultant signal.

10. The method according to claim 9, wherein said data recording medium is an optical data recording medium, and
said generating comprises:
detecting said detection signals by an optical detector from a reflection beam from said optical data recording medium when a light beam is irradiated to said optical data recording medium.

11. The method according to claim 2, wherein said optical detector has at least two detection areas, from which said detection signals are generated, and
said generating comprises:
generating said first and second signals $I_1$ and $I_2$ by grouping said at least two detection areas into two based on a line in a direction perpendicular to a radial direction of said optical data recording medium, and by combining said detection signals in units of groups when a light beam is irradiated to said optical data recording medium.

12. An apparatus of obtaining a reproduction signal with good quality from a data recording medium, comprising:
a head section which generates two actual signals as first and second signals $I_1$ and $I_2$ from detection signals obtained from said data recording medium; and
a processing section which calculates a coefficient k which has linear correlation with a tilt, based on said first and second signals $I_1$ and $I_2$,
wherein said processing section comprises:
an impulse response calculating section which calculates an impulse response of said first signal $I_1$ expressed by the following equation (9)

$$\sum_i^N h_{1i} \quad (9)$$

(N is a natural number and i is a time in units of clocks), and an impulse response of said second signal $I_2$ expressed by the following equation (10)

$$\sum_i^N h_{2i} \quad (10)$$

(N is a natural number and i is time in units of clocks);

a coefficient calculating section which calculates said coefficient k from the following equation (11)

$$k = \frac{-\left((\sigma_1^2 + \sigma_2^2 + 2\sigma_{12})\left(\sum_i^N r_i q_i\right) - (\sigma_1^2 - \sigma_2^2)\left(\sum_i^N q_i^2\right)\right)}{(\sigma_1^2 + \sigma_2^2)\left(\sum_i^N (r_i^2 - q_i^2)\right) + 2\sigma_{12}\left(\sum_i^N (r_i^2 - q_i^2)\right)} \quad (11)$$

wherein an expected value of noise of said first signal $I_1$ is $\sigma_1$, an expected value of noise of said second signal $I_2$ is $\sigma_2$, and an expected value of correlation of the noises of said first and second signals $I_1$ and $I2$ is $\sigma_{12}$, $q_i = h_{1i} + h_{2i}$, and $r_i = h_{1i} - h_{2i}$.

13. An apparatus of obtaining a reproduction signal with good quality from a data recording medium, comprising:
a head section which generates two actual signals as first and second signals $I_1$ and $I_2$ from detection signals obtained from said data recording medium; and
a processing section which calculates a coefficient k which has linear correlation with a tilt, based on said first and second signals $I_1$ and $I_2$,
wherein said processing section comprises:
an expected value calculating section which calculates an expected value $\sigma_1$ of noise of said first signal $I_1$, an expected value $\sigma_2$ of noise of said signal $I_2$, and an expected value $\sigma_{12}$ of correlation of the noises of said signals $I_1$ and $I_2$; and
a coefficient calculating section which calculates said coefficient k from the following equation (12)

$$k = \frac{(\sigma_1^2 - \sigma_2^2)}{2\sigma_{12} - (\sigma_1^2 + \sigma_2^2)} \quad (12)$$

by using said expected value $\sigma_1$, said expected value $\sigma_2$, and said expected value $\sigma_{12}$.

14. An apparatus of obtaining a reproduction signal with good quality from a data recording medium, comprising:
a head section which generates two actual signals as first and second signals $I_1$ and $I_2$ from detection signals obtained from said data recording medium; and
a processing section which calculates a coefficient k which has linear correlation with a tilt, based on said first and second signals $I_1$ and $I_2$,
wherein said processing section comprises:
an expected value calculating section which calculates an expected value $\sigma_1$ of noise of said first signal $I_1$, and an expected value $\sigma_2$ of noise of said signal $I_2$; and
a coefficient calculating section which calculates said coefficient k from the following equation (13)

$$k = \frac{(\sigma_2^2 - \sigma_1^2)}{(\sigma_1^2 + \sigma_2^2)} \quad (13)$$

by using said expected value σ1, and said expected value σ2.

15. An apparatus of obtaining a reproduction signal with good quality from a data recording medium, comprising:
a head section which generates two actual signals as first and second signals $I_1$ and $I_2$ from detection signals obtained from said data recording medium; and
a processing section which calculates a coefficient k which has linear correlation with a tilt, based on said first and second signals $I_1$ and $I_2$,
wherein said processing section comprises:
an SNR calculating section which calculates SNR1 as a ratio of a signal component and a noise component of said first signal $I_1$, SNR2 as a ratio of a signal component and a noise component of said second signal $I_2$, and SNR3 as a ratio of a signal component and a noise component of a signal $I_1 + I_2$ obtained by adding said first and second signals $I_1$ and $I_2$; and
a coefficient calculating section which calculates said coefficient k from the following equation (14) or (15)

$$k = \frac{SNR2 - SNR1}{SNR3} \quad (14)$$

$$k = \frac{SNR2 - SNR1}{SNR1 + SNR2} \quad (15)$$

by using said SNR1, said SNR2 and said SNR3.

16. The apparatus according to claim 15, wherein said SNR calculating section calculates each of said SNR1, said SNR2, and said SNR3 from the following equation (16)

$$\frac{\left(\sum_m \epsilon_m^2\right)^2}{E\left[\left(\sum_m \epsilon_m n_m\right)^2\right]} \quad (16)$$

where E is a vector, n is the noise indicating a difference between an ideal signal waveform and a waveform of said actual signal, and a symbol E[ ] indicating an expected value.

17. The apparatus according to claim 16, wherein each of said SNR1, said SNR2, and said SNR3 is selected as the least value among results of said equation (16) when said vector ε takes the following ε1, ε2, ε3,
ε1=(1,2,2,2, 1)
ε2=(1,2, 1,0,−1,−2,−1), and
ε3=(1,2,1, 0, 0, 0, 1,2, 1).

18. The apparatus according to claim 15, wherein each of said SNR1, said SNR2, and said SNR3 is a PRSNR as an SNR of a PR system which carries out signal reproduction using PRML to said first signal $I_1$, said second signal $I_2$, and a summation of said first and second signals $I_1$ and $I_2$.

19. An apparatus of obtaining a reproduction signal with good quality from a data recording medium, comprising:
a head section which generates two actual signals as first and second signals $I_1$ and $I_2$ from detection signals obtained from said data recording medium; and
a processing section which calculates a coefficient k which has linear correlation with a tilt, based on said first and second signals $I_1$ and $I_2$,
wherein said processing section further comprises:
a signal correcting section which carries out a calculation of $I_1 + I_2 + K*(I_1 - I_2)$ by using said coefficient k, and said first and second signals $I_1$ and $I_2$ to produce a calculation resultant signal.

20. The apparatus according to claim 19, wherein said data recording medium is an optical data recording medium, and said head section comprises:
a laser diode which irradiates a light beam to said optical data recording medium; and a light receiving section which detects said detection signals from a reflection light beam from said optical data recording medium.

21. The apparatus according to claim 20, wherein said light receiving section has at least two detection areas, from which said detection signals are generated, and said light receiving section generates said first and second signals $I_1$ and $I_2$ by grouping said at least two detection areas into two based on a line in a direction perpendicular to a radial direction of said optical data recording medium, and by combining said detection signals in units of groups when a light beam is irradiated to said optical data recording medium.

22. The apparatus according to claim 19, further comprising:

a servo controller which controls said head section to eliminate said tilt; and a system controller which controls said servo controller based on said coefficient k.

* * * * *